United States Patent
Yang et al.

(10) Patent No.: US 11,973,336 B2
(45) Date of Patent: Apr. 30, 2024

(54) CIRCUIT AND PLUG FOR TIMING AUTOMATIC DETECTION OF LEAKAGE PROTECTION FUNCTION

(71) Applicant: DongGuan City TuoCheng Industries Co., Ltd., Dongguan (CN)

(72) Inventors: Juntuo Yang, Dongguan (CN); Dong Wei, Dongguan (CN)

(*) Notice: Subject to any disclaimer, the term of this patent is extended or adjusted under 35 U.S.C. 154(b) by 70 days.

(21) Appl. No.: 17/824,072

(22) Filed: May 25, 2022

(65) Prior Publication Data

US 2023/0318280 A1  Oct. 5, 2023

(30) Foreign Application Priority Data

Apr. 2, 2022  (CN) .......................... 202220774406.5

(51) Int. Cl.
| | |
|---|---|
| *H02H 3/16* | (2006.01) |
| *H01R 13/512* | (2006.01) |
| *H01R 13/52* | (2006.01) |
| *H02H 1/00* | (2006.01) |

(52) U.S. Cl.
CPC .............. *H02H 3/16* (2013.01); *H01R 13/512* (2013.01); *H01R 13/5202* (2013.01); *H02H 1/0007* (2013.01)

(58) Field of Classification Search
CPC .. G01R 31/52; H01R 13/512; H01R 13/5202; H02H 1/0007; H02H 3/00; H02H 3/16; H02H 3/33; H02H 3/347; H02H 5/105
See application file for complete search history.

(56) References Cited

U.S. PATENT DOCUMENTS

| | | | |
|---|---|---|---|
| 10,991,534 B1* | 4/2021 | Yang | H02H 3/28 |
| 11,588,316 B2* | 2/2023 | Yang | H01H 83/144 |
| 2012/0170159 A1* | 7/2012 | Huang | G01R 31/52 |
| | | | 361/42 |
| 2012/0320485 A1* | 12/2012 | Huang | H02H 1/04 |
| | | | 361/114 |
| 2021/0118869 A1* | 4/2021 | Li | H02H 3/335 |

(Continued)

FOREIGN PATENT DOCUMENTS

| | | | | |
|---|---|---|---|---|
| CN | 201466675 U | * | 5/2010 | |
| CN | 214754507 U | * | 11/2021 | ........... H01H 47/001 |
| WO | WO-2018120943 A1 | * | 7/2018 | |

*Primary Examiner* — Jared Fureman
*Assistant Examiner* — Nicolas Bellido
(74) *Attorney, Agent, or Firm* — Prakash Nama; Global IP Services, PLLC

(57) ABSTRACT

A plug has a power supply module, a leakage detection module, a timing module, an input terminal for external power supply and an output terminal for outputting voltage, a current loop is formed between the input terminal and the output terminal, the power module is connected to an external power source through the input terminal, the power module includes a rectifier unit D3 and a power control unit, the input of the rectifier unit D3 and the input terminal are electrically connected. The invention has the function of automatically disconnecting the line output when the line has leakage, protecting the plug and the externally connected electrical appliances, and at the same time, it can automatically perform self-checking at regular intervals to check whether the leakage protection function can be used normally, thereby improving the plug's reliability.

9 Claims, 18 Drawing Sheets

(56) References Cited

U.S. PATENT DOCUMENTS

2022/0231498 A1\* 7/2022 Yang .................. H02H 3/162
2021/0111554 A1\* 10/2023 Li ........................ H02H 7/20
2023/0344215 A1\* 10/2023 Yang .................... H02H 3/16

\* cited by examiner

CIRCUIT AND PLUG FOR TIMING AUTOMATIC DETECTION OF LEAKAGE PROTECTION FUNCTION

FIELD

The present invention relates to the technical field of plugs, in particular to a circuit and a plug for timing automatic detection of leakage protection function.

BACKGROUND

Plugs are necessary electrical appliances in daily life. In many cases, household electrical appliances will be equipped with corresponding safety protection measures and structures. However, for environmental lines, most of the time, the safety performance of the line is improved through structures such as fuses, but it is easy to throw away. Dangerous situations such as electric leakage occur on the line. Even if the household electrical appliances have a safety protection structure, it is difficult to ensure that they can always be safe at the line end. Therefore, the plug has become an important part, and the dangerous situation such as electric leakage can be cut off from the plug. In the prior art, a circuit for safe use is added to the plug, such as detecting whether the circuit has leakage, but after long-term use, whether the safe use structure in the plug can still be used normally, and whether it can still be used when the circuit has leakage. There is no good guarantee to disconnect the output of the line in time, that is, there is also uncertainty in the use of the plug.

SUMMARY OF THE DISCLOSURE

In view of the foregoing problems and aiming at the problems of the prior art, the present invention provides a circuit and a plug with a function of timing and automatic detection of leakage protection function, which have the functions of automatically disconnecting the line output when leakage occurs in the circuit, protecting the plug and externally connected electrical appliances, and at the same time, it can also automatically perform automatic detection at regular intervals. Check to see if the leakage protection function can be used normally, thereby improving the safety of the use of the plug.

One of the aspect of the present invention is to provide a circuit for timing automatic detection of leakage protection function, comprising, a power supply module, a leakage detection module, a timing module, an input terminal for external power supply and an output terminal for outputting voltage, a current loop is formed between the input terminal and the output terminal, and characterized in that:

the power supply module is connected to an external power supply through an input terminal, the power supply module includes a rectifier unit D3 and a power control unit, and the input of the rectifier unit D3 is electrically connected to the input terminal;

the leakage detection module includes a main controller U1, a transformer and a circuit breaker X1, the transformer is used to sense whether there is a leakage signal in the current loop, the transformer is connected to the main controller U1, and the rectifier unit D3 is connected to the control terminal of the circuit breaker X1 through the power control unit, a circuit switch S1 is connected between the input terminal and the output terminal, and the main controller U1 controls the operation of the power control unit according to the induction signal of the transformer, the power control unit is used to make the circuit breaker X1 work according to the control signal of the main controller U1, and the circuit breaker X1 is used to open or close the circuit switch S1 according to the control signal of the power control unit;

the timing module includes a timer U2 and a circuit on-off unit, the timer U2 is used to generate a control signal to the control terminal of the circuit on-off unit at regular intervals, and the switch terminal of the circuit on-off unit is connected to the power supply module, the circuit on-off unit is used to control whether the current loop outputs voltage to the output terminal.

Preferably, the power control unit includes a switch tube Q3, a switch tube Q4, a diode D5, a resistor R16, a resistor R17, a switch tube Q1, a switch tube Q2, a diode D4 and a diode D14; the input terminal is connected to a switch terminal of the switch tube Q4 through the control terminal of the switch tube Q3, the other switch terminal of the switch tube Q4 is grounded, the control terminal of the switch tube Q4 is connected to the main controller U1, and the rectifier unit D3 is connected to one switch terminal of the switch tube Q3 through the resistor R16, the other switch terminal of the switch tube Q3 is connected to the anode of the diode D14, the cathode of the diode D14 is connected to the cathode of the diode D4, and the anode of the diode D4 is connected to the main controller U1; resistor R16 is connected to the cathode of diode D5, the anode of diode D5 is connected to ground through;

the output of the rectifier unit D3 is connected to a switch end of the switch tube Q1 through a switch end of the switch tube Q2, the control end of the switch tube Q2 is connected to a switch end of the switch tube Q1, and the other switch end of the switch tube Q1 is connected to the circuit breaker, the control terminal of X1 is connected, the other control terminal of the circuit breaker X1 is grounded, the control terminal of the switch tube Q1 is connected to the anode of the diode D5, and the other switch terminal of the switch tube Q2 is connected to the control terminal of the switch tube Q1.

Preferably, the circuit on-off unit includes a relay K1, a diode D13, a switch tube Q5 and a rectifier unit D12;

the rectifier unit D12 rectifies the input signal of the input terminal, one end of the coil of the relay K1 is connected to the output end of the rectifier unit D12, the other end of the coil of the relay K1 is connected to a switch end of the switch tube Q5, and the other end of the switch tube Q5 is connected, one switch terminal is grounded, the control terminal of the switch tube Q5 is connected to the timer U2, one switch terminal of the relay K1 is connected to the input terminal, the other switch terminal of the relay K1 is connected to the output terminal, and the two ends of the diode D13 are respectively connected to both the relay ends of the coil of K1.

Preferably, the circuit on-off unit includes a resistor R27, an optocoupler U3 and a switch tube Q6, the timer U2 is connected to one end of the light emitter of the optocoupler U3, and the other end of the light emitter of the optocoupler U3 is connected to a switch end of the switch tube Q6, the other switch end of the switch tube Q6 is grounded, the control end of the switch tube Q6 is connected to the timer U2, one end of the light receiver of the optocoupler U3 is connected to the output end of the rectifier unit D3 through the resistor R27, and the light receiver of the optocoupler U3 is connected to the output end of the rectifier unit D3, and the other end is grounded.

Preferably, the timing module also includes an indicator unit, the indicator unit includes a plurality of LED lights, and the plurality of LED lights are all connected to the timer U2.

Another aspect of the present invention is to provide a plug, comprising an outer shell, a control assembly installed in the outer shell, and a button control assembly installed in the outer shell, characterized in that the control assembly is provided with any one of claims 1 to 9 that automatically detects leakage at regular intervals circuit for protection.

Preferably, the plug further includes a waterproof ring, the outer shell includes an upper shell and a lower shell, the waterproof ring is located between the upper shell and the lower shell, and the upper shell is sealedly connected to the lower shell through the waterproof ring. The button control assembly includes a button, a button waterproof unit and a button fixing unit, the button is installed in the outer shell, the button fixing unit is installed in the outer shell, and the button fixing unit is used for connecting with the control unit circuit board contact, the button waterproof unit is installed between the button and the button fixing unit.

Preferably, the outer shell also includes a plurality of screws, the waterproof ring is provided with a plurality of locking holes, and the upper shell and the lower shell are provided with screw holes corresponding to the locking holes; the screws pass through the screw holes of the upper shell, the lock hole of the waterproof ring and the screw hole of the lower shell are screwed with the two screw holes.

Preferably, the side of the upper shell close to the lower shell is provided with a first connecting convex ring and a first annular groove, and the lower shell is provided with a second annular groove and a second connecting convex ring; the upper shell and the lower shell are assembled; after that, the waterproof ring is assembled in the first annular groove and the second annular groove, the first connecting convex ring is assembled in the second annular groove, and the second connecting convex ring is assembled in the first annular groove an annular groove, and both the first connecting convex ring and the second connecting convex ring are in contact with the waterproof ring;

the lower shell includes a first half shell and a second half shell connected to the first half shell, the waterproof ring is provided with a connecting ring, and both sides of the connecting ring are protruded with a first sealing ring, and the one end of the half shell close to the second half shell is provided with a first waterproof groove, one end of the second half shell close to the first half shell is opened with a second waterproof groove, and the first sealing rings on both sides of the connecting ring are respectively assembled in the first waterproof groove and the second waterproof groove.

Preferably, the button waterproof unit includes a waterproof elastic sheet, the button fixing unit includes a connection terminal, an elastic reset piece and a fixing seat, the waterproof elastic sheet is located between the outer shell and the fixing seat, and the fixing seat is provided with a reset hole and a fixing seat. a terminal hole, the elastic reset piece is assembled in the reset hole, the connection terminal is movably assembled in the terminal hole, and the connection terminal is in contact with the elastic reset piece; the control circuit board is provided with contacts, and the housing is provided with a through hole for the button to extend into the inside of the outer shell, the button drives the connecting terminal to contact the contact through the contact with the waterproof elastic sheet, the elastic reset piece is used to drive the connecting terminal and the contact to separate, and the waterproof elastic sheet is used to cover the through hole;

the waterproof elastic sheet is protruded with a second sealing ring, the inner wall of the outer shell is provided with a sealing groove, the second sealing ring is assembled in the sealing groove, and the through hole is located in the ring formed by the sealing ring.

The beneficial effects of the present invention:
1. It can automatically disconnect the output of the line when the line has leakage, improve the safety of use and protect the safety of the environmental line;
2. It can regularly conduct self-check of the leakage protection function of the circuit, and regularly check whether each protection element can work normally to prevent the leakage protection function from failing.

Figure 1:
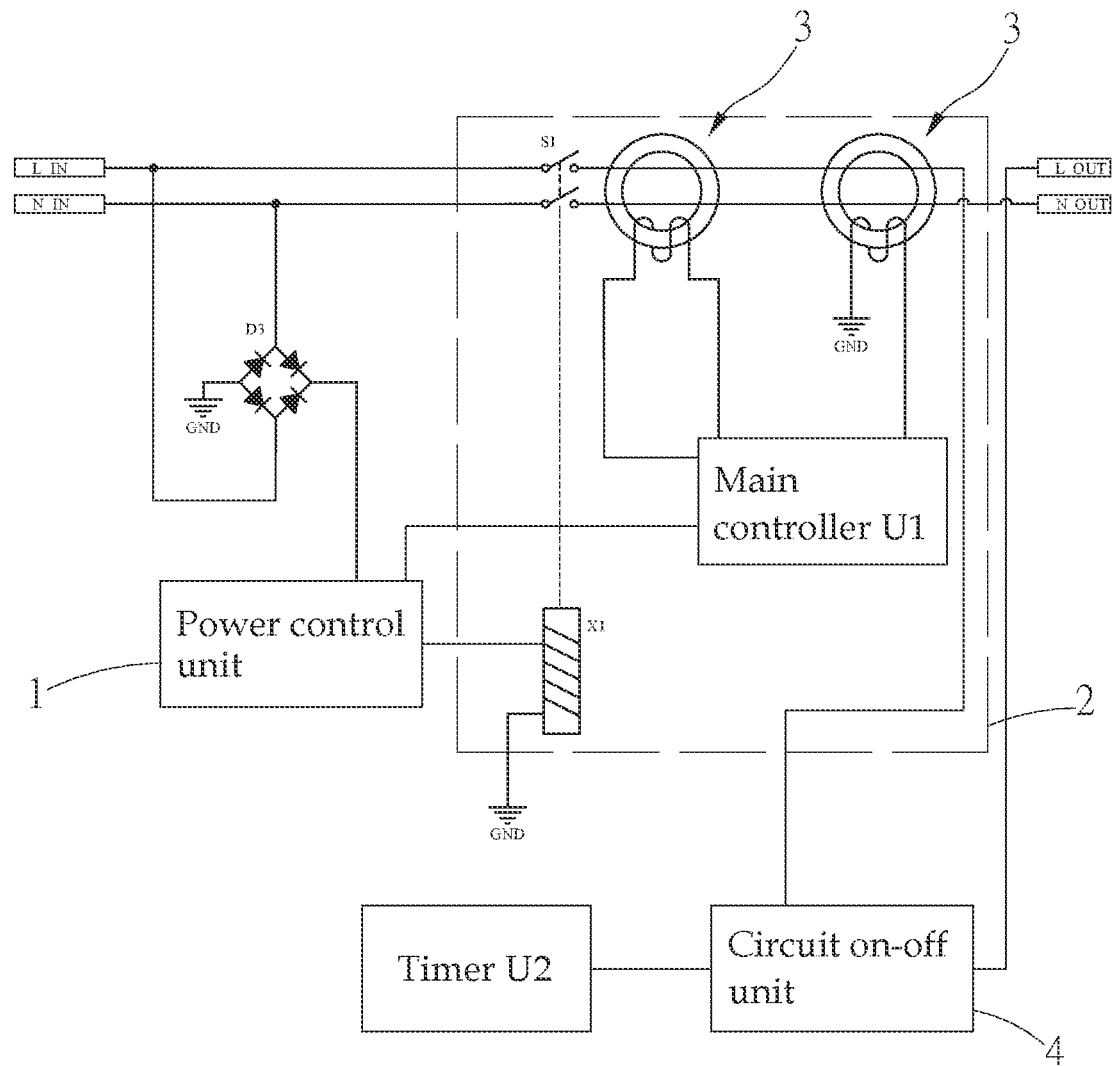
FIG. 1 is a signal block diagram of embodiment 1 of the present invention.

Reference numerals in FIGS. 1 to 13 include: 1—Power control unit, 2—Electrical leakage detection module, 3—Transformer, 4—Circuit on-off unit, 5—Upper shell, 6—First half shell, 7—Second half shell, 8—First connection convex ring, 81—Second connection convex ring, 9—First annular groove, 91—Second annular groove, 10—Waterproof ring, 11—Control circuit board, 12—Voltage output unit, 13—Button, 14—Screw, 15—Lock hole, 16—Screw hole, 17—Connecting ring, 18—First sealing ring, 19—First waterproof groove, 20—Second waterproof groove, 21—Waterproof elastic sheet, 22—Connecting terminal, 23—Elastic Reset piece, 24—Fixing seat, 25—Reset hole, 26—Terminal hole, 27—Contact, 28—Through hole, 29—Second sealing ring, 30—Sealing groove, 31—First positioning block, 32—No. Two positioning blocks, 33—limit block, 34—button limit groove, 35—break bracket, 36—switch bracket, 37—breaker, 38—break switch, 39—switch control, 40—rotating shaft, 41—control Arm, 42—turn hole.

DETAILED DESCRIPTION

In order to have the Examiner to further understand the structure, features and other purposes of the present invention, the following preferred embodiments are attached with drawings for detailed descriptions as follows. However, the embodiments described in the drawings are for illustrative purposes. It is not the only restriction for the purpose of the present patent application.

Embodiment 1

A circuit for timing automatic detection of leakage protection function provided by this embodiment, as shown in FIG. 1 and FIG. 2, includes a power supply module, a leakage detection module 2, a timing module, an input terminal for external power supply, and an output terminal for outputting voltage, a current loop is formed between the input terminal and the output terminal, the power supply module is connected to an external power supply through the input terminal, the power supply module includes a rectifier unit D3 and a power control unit 1, and the input of the rectifier unit D3 is connected to the external power supply. The input terminals are electrically connected; the rectifier unit D3 is a conventional rectifier bridge; as shown in FIGS. 2a and 2b, the input terminals include a neutral line input terminal L_IN and a live wire input terminal N_IN, and the output terminals include a neutral wire output terminal LOUT and a live wire output terminal N_OUT. The power is input from the neutral line input terminal L_IN and the live wire input terminal N_IN, and is output from the neutral wire output terminal LOUT and the live wire output terminal N_OUT, thus forming a current loop.

Figure 2A:
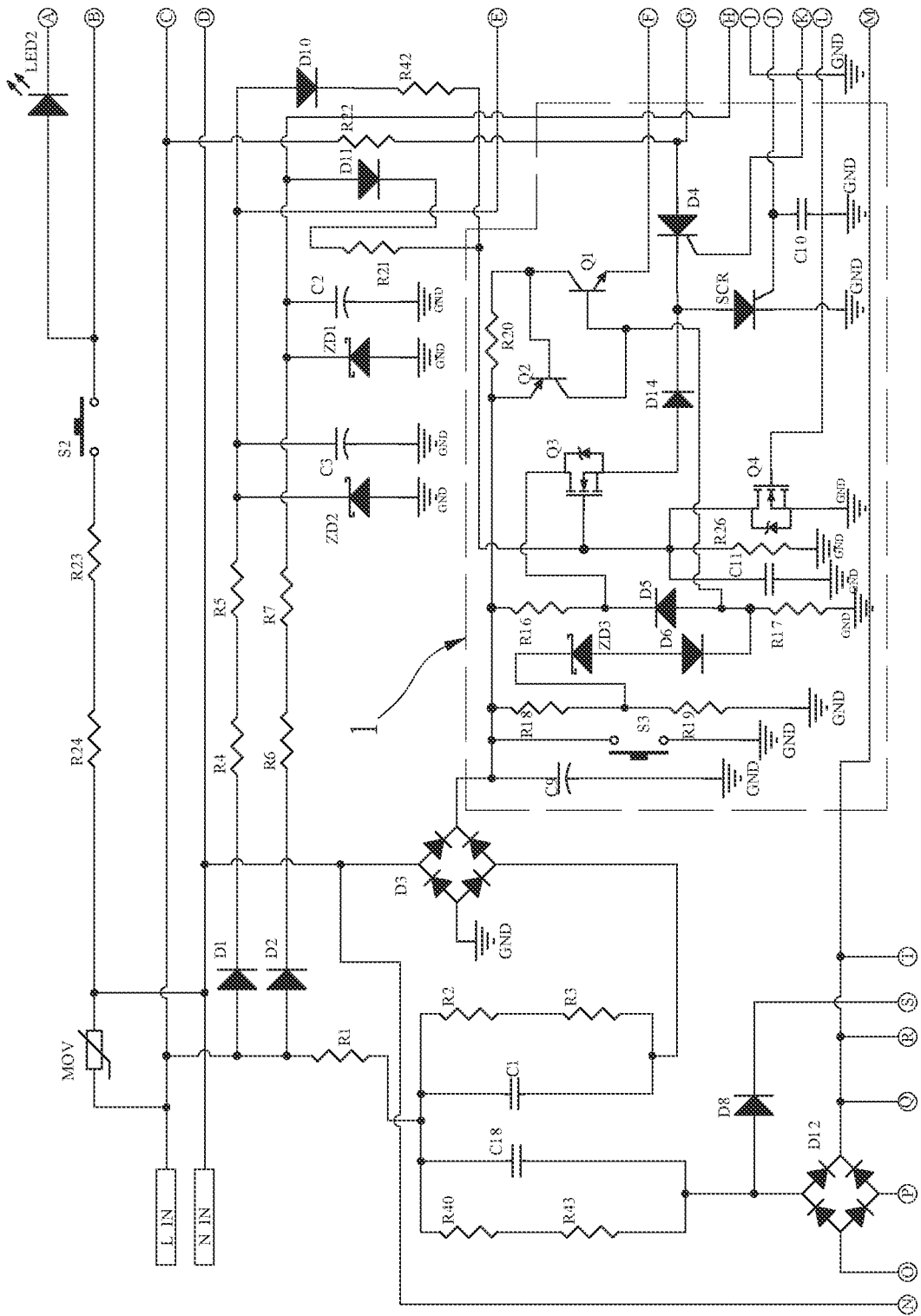
FIG. 2a-2d are four parts of a circuit schematic diagram of embodiment 1 of the present invention.
Figure 2B:
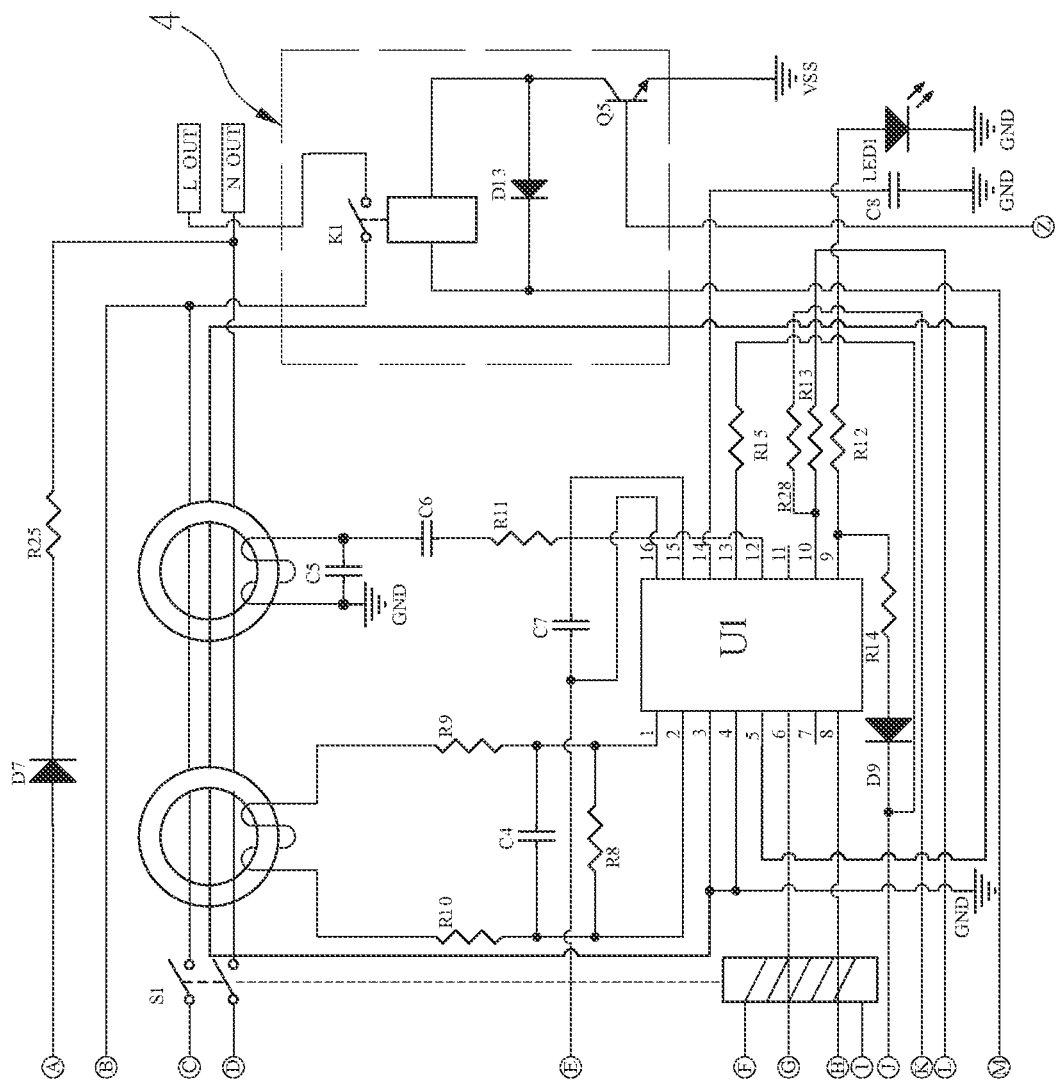
Figure 2C:
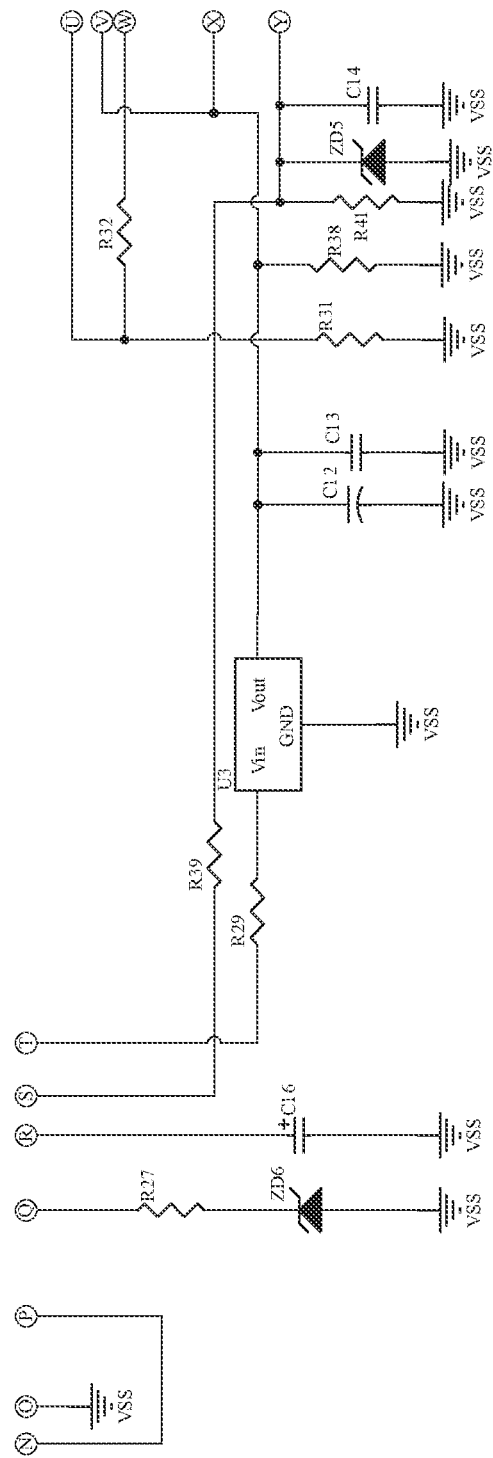
Figure 3:
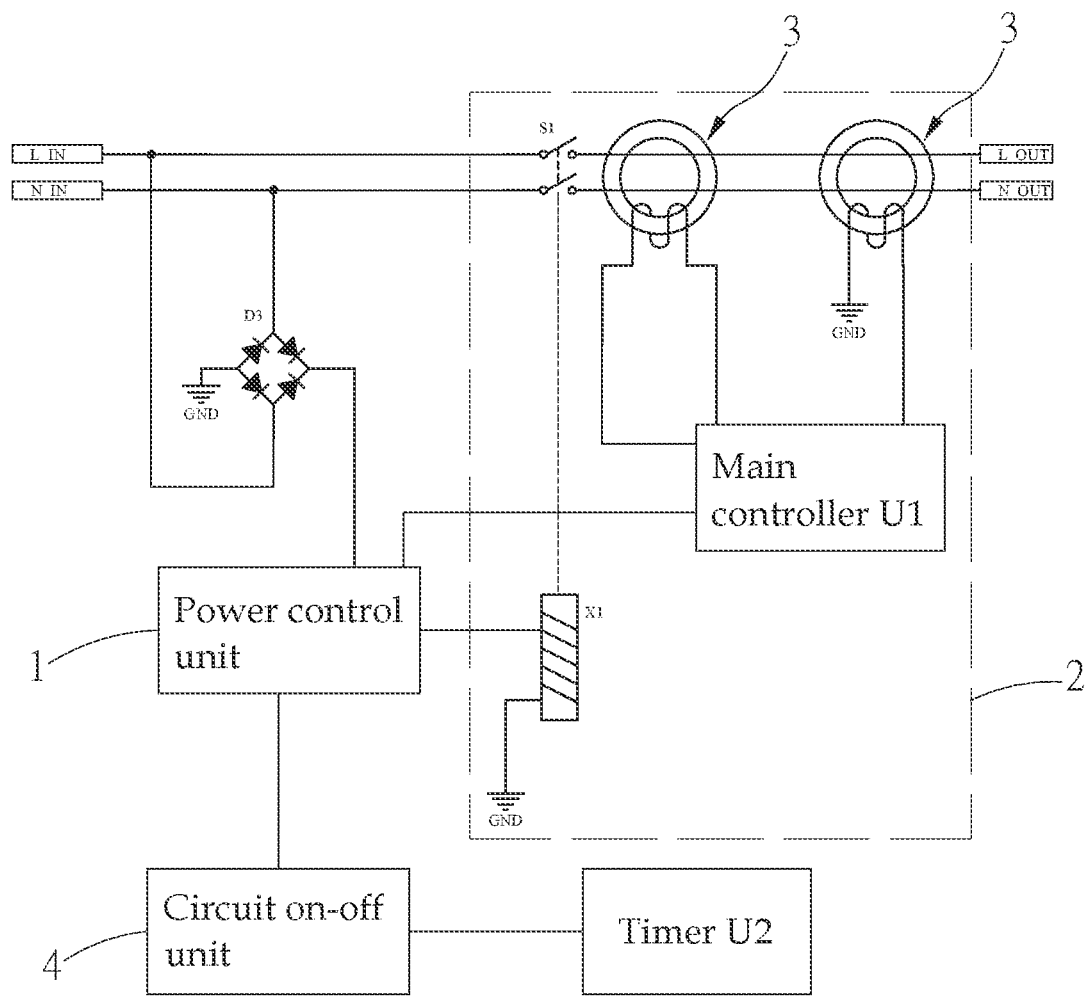
FIG. 3 is a signal block diagram of embodiment 2 of the present invention.
Figure 4A:
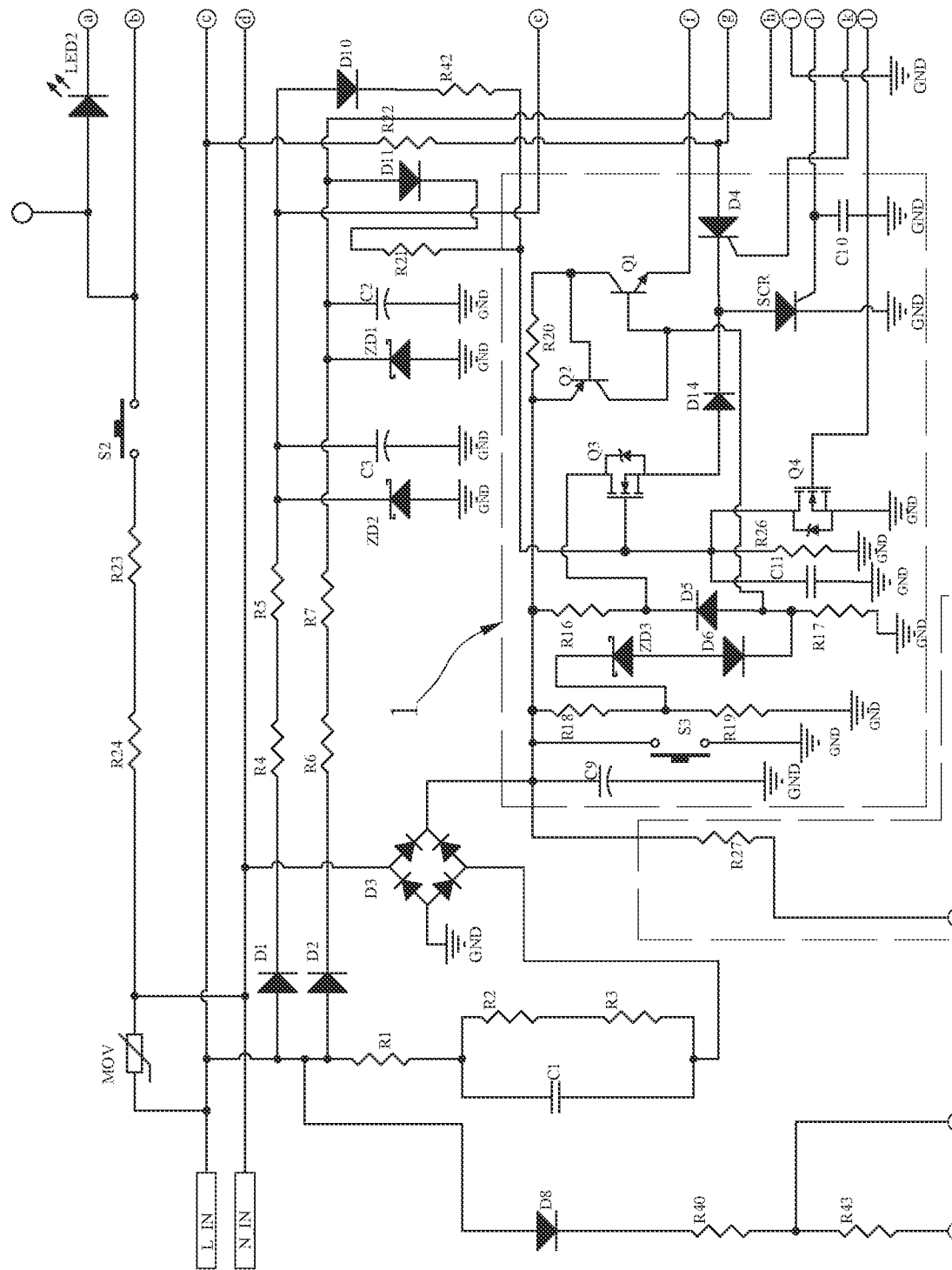
FIG. 4a-4d are four parts of a schematic circuit diagram of Embodiment 2 of the present invention.
Figure 4B:
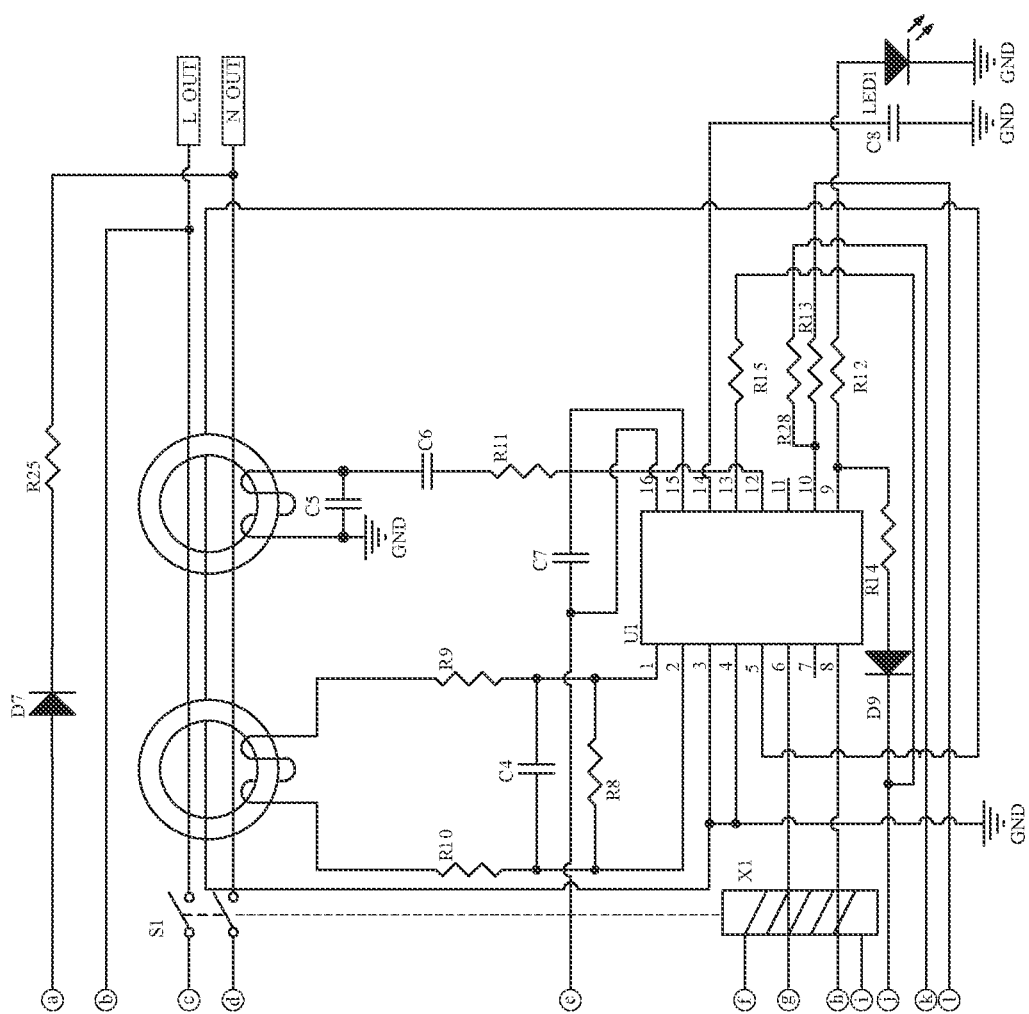
Figure 4C:
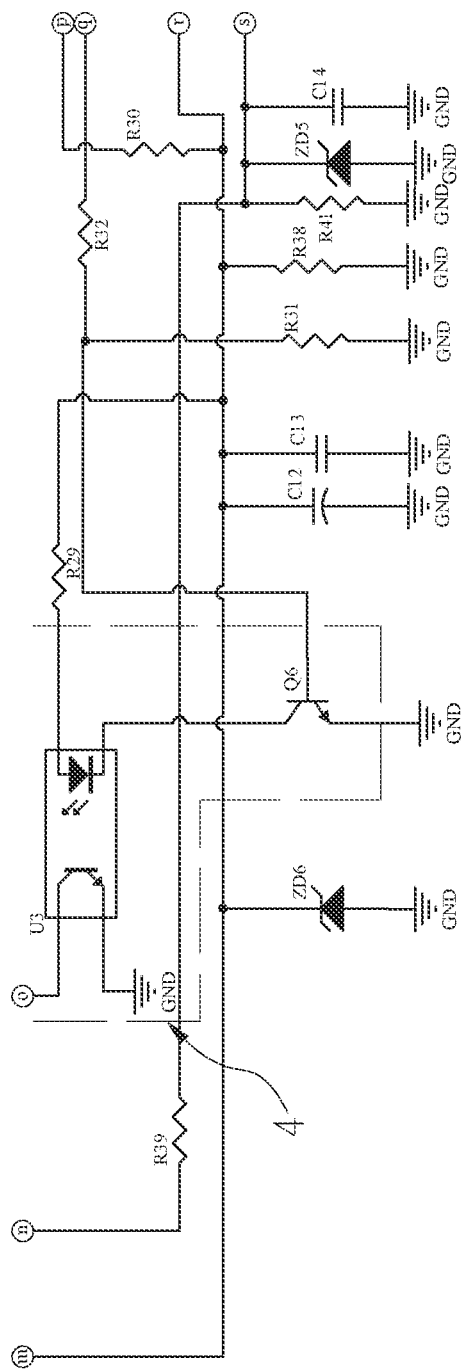
Figure 4D:
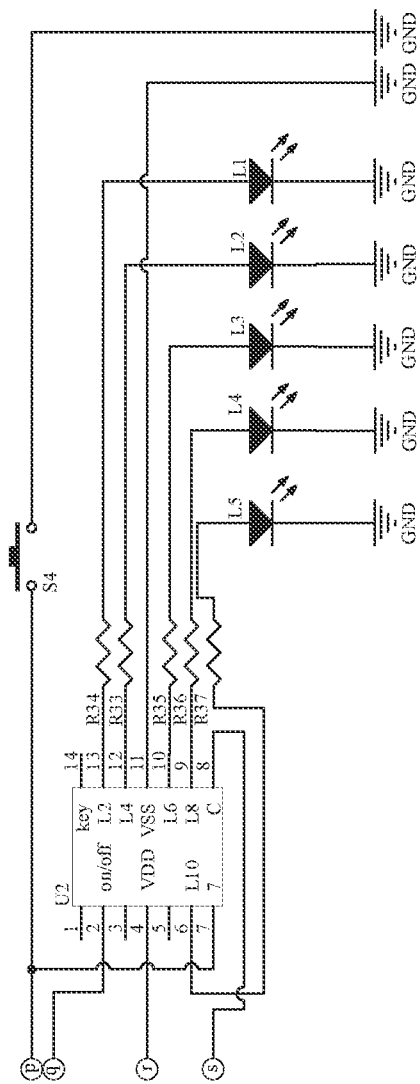

The leakage detection module 2 includes a main controller U1, a transformer 3 and a circuit breaker X1. As shown in FIG. 2a, 2b and FIG. 3, the two transformers 3 are respectively installed on the current loop to sense whether there is a leakage signal in the current loop. The output of the transformer 3 is connected to the main controller U1, so the sensed signal can be transmitted to the main controller U1, and the output of the rectifier unit D3 is connected to the control end of the circuit breaker X1 through the power control unit 1, a circuit switch S1 is connected between the input terminal and the output terminal. The main controller U1 controls the work of the power control unit 1 according to the induction signal of the transformer 3, and the power control unit 1 makes the circuit breaker X1 work according to the control signal of the main controller U1. The circuit breaker X1 is used to open or close the circuit switch S1 according to the control signal of the power control unit 1; the circuit breaker X1 in this embodiment can be, for example, an electromagnet, and realizes the connection of the circuit switch S1 by means of electromagnetization. Control, when there is a pressure difference between the two ends of the circuit breaker X1, the electromagnet generates magnetism and attracts the circuit switch S1 in the current loop, so that the circuit switch 51 is disconnected, so that the current loop is disconnected without output.

Specifically, when this embodiment works, when the transformer 3 senses the leakage current of the current loop, it transmits the sensed signal to the main controller U1, and the main controller U1 transmits the signal to the power control unit 1, and the power control unit transmits the signal to the power control unit 1 to generate a pressure difference between the two ends of the circuit breaker X1, and then the circuit breaker X1 disconnects the circuit switch 51 and disconnects the output of the current circuit, thereby ensuring the safety of the line and users.

The power control unit 1 of this embodiment includes a switch tube Q3, a switch tube Q4, a diode D5, a resistor R16, a resistor R17, a switch tube Q1, a switch tube Q2, a diode D4 and a diode D14; the specific circuit connection principle is shown in FIG. 2a 2b, the input terminal is connected to one switch terminal of the switch tube Q4 through the control terminal of the switch tube Q3, the other switch terminal of the switch tube Q4 is grounded, the control terminal of the switch tube Q4 is connected to the main controller U1, and the rectifier tube Q4 is connected to the main controller U1. The unit D3 is connected to one switch terminal of the switch tube Q3 through the resistor R16, the other switch terminal of the switch tube Q3 is connected to the anode of the diode D14, the cathode of the diode D14 is connected to the cathode of the diode D4, and the anode of the diode D4 is connected to the main controller U1 connection; resistor R16 is connected to the cathode of diode D5, and the anode of diode D5 is grounded through resistor R17; the output of rectifier unit D3 is connected to a switch end of switch tube Q1 through a switch end of switch tube Q2, and the control end of switch tube Q2 is connected to One switch terminal of the switch tube Q1 is connected, the other switch terminal of the switch tube Q1 is connected to the control terminal of the circuit breaker X1, the other control terminal of the circuit breaker X1 is grounded, and the control terminal of the switch tube Q1 is connected to the anode of the diode D5. The other switch terminal of the tube Q2 is connected to the control terminal of the switch tube Q1.

Specifically, the present embodiment realizes the leakage detection function through the cooperation of the power control unit 1 and the leakage detection module 2. The specific working principle is as follows: when the transformer 3 detects the leakage current, the detected signal is transmitted to the main controller U1, the main controller U1 sends a level signal to control the switch tube Q4 to turn off, so that the switch tube Q3 is turned on, and the switch tube Q3 is turned on to make the switch tube Q1 turn on, so the circuit breaker X1 turns on the rectifier unit D3, and the circuit breaker X1 There is a pressure difference between the two ends of the circuit, thus generating a magnetic adsorption circuit switch 51, which disconnects the circuit switch 51, thereby disconnecting the current circuit, and the output terminal has no voltage output to avoid dangerous accidents caused by leakage.

Further, this embodiment also has the function of timing self-checking leakage protection, and the timing control function is realized through the timing module. The timing module includes a timer U2 and a circuit on-off unit 4, and the timer U2 is used for timing to generate a control signal to the control terminal of the circuit on-off unit 4, the switch terminal of the circuit on-off unit 4 is connected to the power supply module, and the circuit on-off unit 4 is used to control whether the current loop outputs voltage to the output terminal. The timer U2 regularly controls the on or off of the circuit on-off unit 4, and the main controller U1 performs the self-check of the leakage function according to the state change of the circuit on-off unit 4. The timer U2 is a common structure such as a timer in the prior art.

Optionally, the circuit on-off unit 4 in this embodiment includes a relay K1, a diode D13, a switch tube Q5 and a rectifier unit D12; the rectifier unit D12 rectifies the input signal of the input terminal, and one end of the coil of the relay K1 is connected to the output end of the rectifier unit D12 is connected, the other end of the coil of the relay K1 is connected to a switch end of the switch tube Q5, the other switch end of the switch tube Q5 is grounded, the control end of the switch tube Q5 is connected to the timer U2, the relay One switch terminal of K1 is connected to the input terminal, that is, to the neutral line input terminal L_IN in FIG. 2b, the other switch terminal of the relay K1 is connected to the output terminal, that is, the neutral line output terminal LOUT, and the two ends of the diode D13 are respectively connected to the relay K1 Both ends of the coil are connected. Specifically, the working principle of the circuit on-off unit 4 is: during normal operation, the switch tube Q5 is turned on, and the normally open contact of the relay K1 is closed, so that a voltage can be output to the zero line output terminal LOUT, and during self-checking, the timer U2 periodically sends a signal to turn off the switch tube Q5. At this time, the coil of the relay K1 is not energized, so the normally open contact of the relay K1 is opened, so that the neutral line output terminal LOUT has no output, so a leakage signal is generated, and the transformer 3 senses the leakage signal is used to control the switching tube Q4 and the switching tube Q3 to work through the main controller U1. If the switch tube Q3 and the switch tube Q4 can work normally, and make the voltage difference between the two ends of the circuit breaker X1, and the circuit switch S1 is disconnected, it means that the leakage protection function of this embodiment is normal; if it cannot make the circuit breaker X1 generate a voltage difference, it means that the leakage detection function of the circuit of this embodiment is abnormal and needs to be repaired. By setting the timing module in this embodiment, the self-check of the leakage function can be performed regularly, so as to ensure that the circuit of this embodiment can work normally or can be repaired in time, and the use safety of this embodiment is improved.

Further, as shown in FIG. 2a, this embodiment further includes a manual switch S3, the first switch terminal of the manual switch S3 is connected to the output terminal of the rectifier module D3, and the second switch terminal of the manual switch S3 is grounded, so that the user can manually reset the circuit breaker X1 through the manual switch S3.

In some embodiments, in this embodiment, the main controller U1 can also be used to automatically detect whether the leakage protection function is normal or not: the main controller U1 controls the switch tube Q4 to turn off so that the switch tube Q3 is turned on. When the switch tube Q3 is not damaged, the diode D4 is turned on when the external AC power supply is positive, the input terminal of the main controller U1 is set to low level, the diode D4 is turned off when the input voltage of the external AC power supply is negative, and the main controller The input terminal of U1 is suspended, which is equivalent to being set to a high level, that is, the input terminal of the main controller U1 will switch between high and low levels when the component is normal. When the switch tube Q4 and the switch tube Q3 are damaged, the switch tube Q3 will continue to be in the conduction state. At this time, the diode D4 will not be turned on because there is no voltage drop across the two ends. The input terminal of the main controller U1 is suspended and remains high level for a long time. In the above-mentioned embodiment, the self-checking of the components used to drive the circuit to open circuit is performed regularly, which can further enable the user to discover the abnormality of the components in advance, and ensure the safety of the electrical equipment and the user.

Further, as shown in FIG. 2a, this embodiment also includes a thyristor SCR, the switching terminal of the switch Q3 is grounded through the thyristor SCR, and the control terminal of the thyristor SCR is connected to the output terminal of the microprocessor. So that the microprocessor U1 can further control the circuit breaker X1 through the thyristor SCR.

Figure 2D:
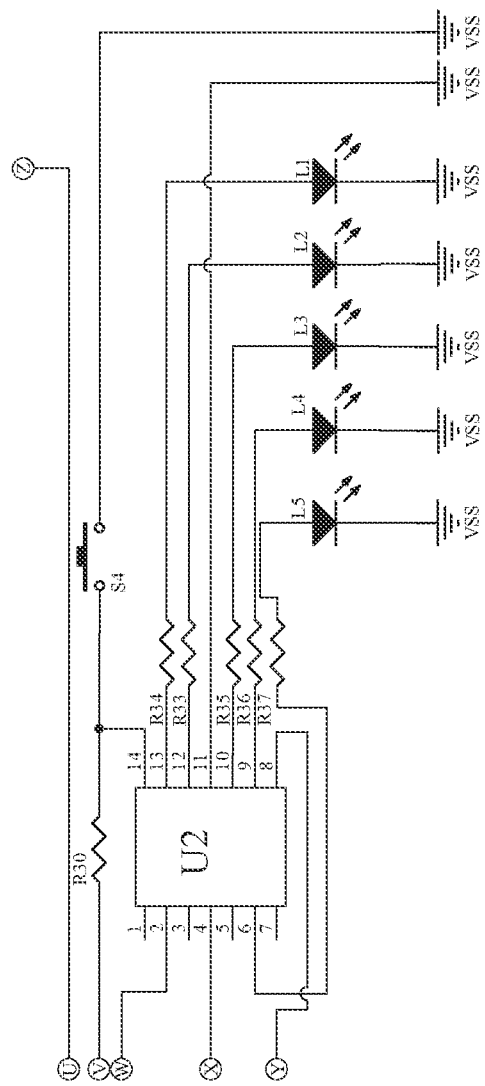

A circuit for timing automatic detection of leakage protection function provided in this embodiment, as shown in FIG. 2d, further includes an indicator unit, and the indicator unit includes a plurality of LED lights, such as the LED lights L1 to L5 in FIG. 2d, a plurality of LED lights They are all connected to the timer U2, and some of the LED lights can be LED lights of different colors. The user is notified by different flashing methods in different states, so that the user can timely understand what the circuit of this embodiment is working on.

Embodiment 2

A circuit for timing automatic detection of leakage protection function provided by this embodiment, as shown in FIGS. 4a to 4d, the circuit on-off unit 4 of this embodiment includes a resistor R27, an optocoupler U3 and a switch tube Q6, a timer U2 and an optocoupler U3 One end of the illuminator is connected, the other end of the illuminator of the optocoupler U3 is connected to a switch end of the switch tube Q6, the other switch end of the switch tube Q6 is grounded, the control end of the switch tube Q6 is connected to the timer U2, the optocoupler end of the light receiver of U3 is connected to the output end of the rectifier unit D3 through the resistor R27, and the other end of the light receiver of the optocoupler U3 is grounded.

Specifically, the timer U2 outputs a shutdown signal within a predetermined time, and controls the optocoupler U3 to be non-conductive, so that the resistance R27 is not grounded, and the voltage difference between the two ends of the circuit breaker X1 cannot be caused; within the predetermined time, when the transformer 3 does not detect When the leakage occurs, the main controller U1 controls the switch tube Q4 to turn on to make the switch tube Q3 turn off. At this time, there is no voltage difference between the two ends of the circuit breaker X1. When the transformer 3 detects the leakage, the main controller U1 controls the switch. The tube Q4 is turned off to turn on the switch tube Q3. At this time, there is a voltage difference between the two ends of the circuit breaker X1; the timer U2 outputs a conduction signal within an unpredetermined time, so that the optocoupler U3 is turned on, and the resistor R27 is grounded. There is a pressure difference across circuit breaker X1.

Embodiment 3

Figure 5:
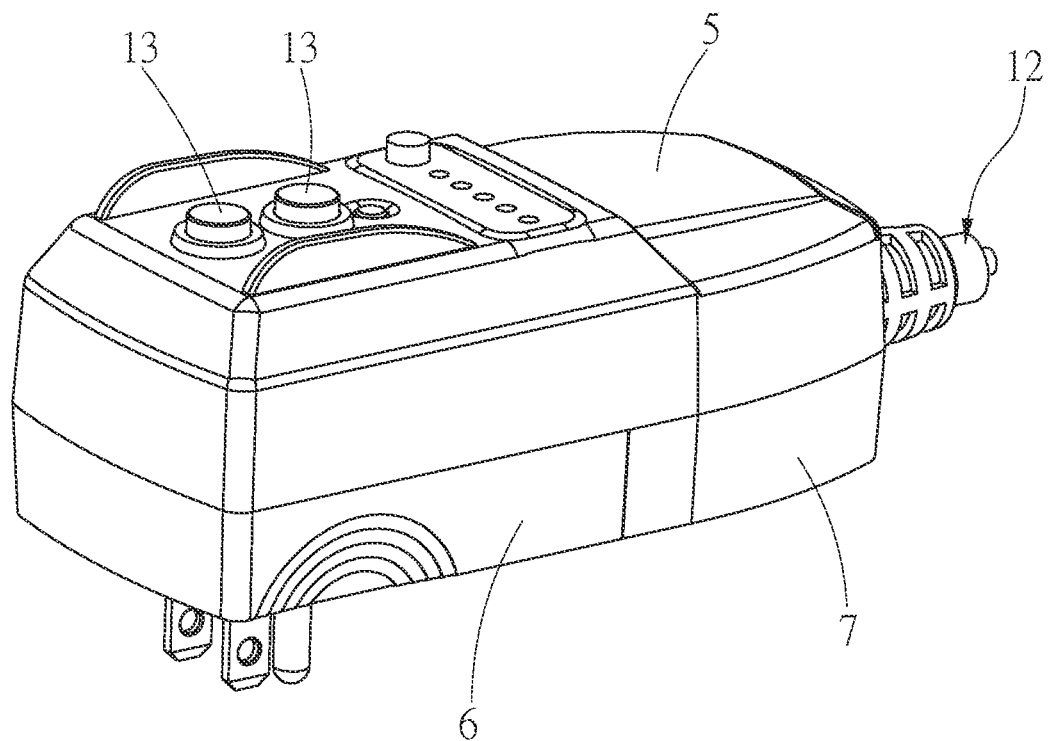
FIG. 5 is the structural representation of the present invention.
Figure 6:
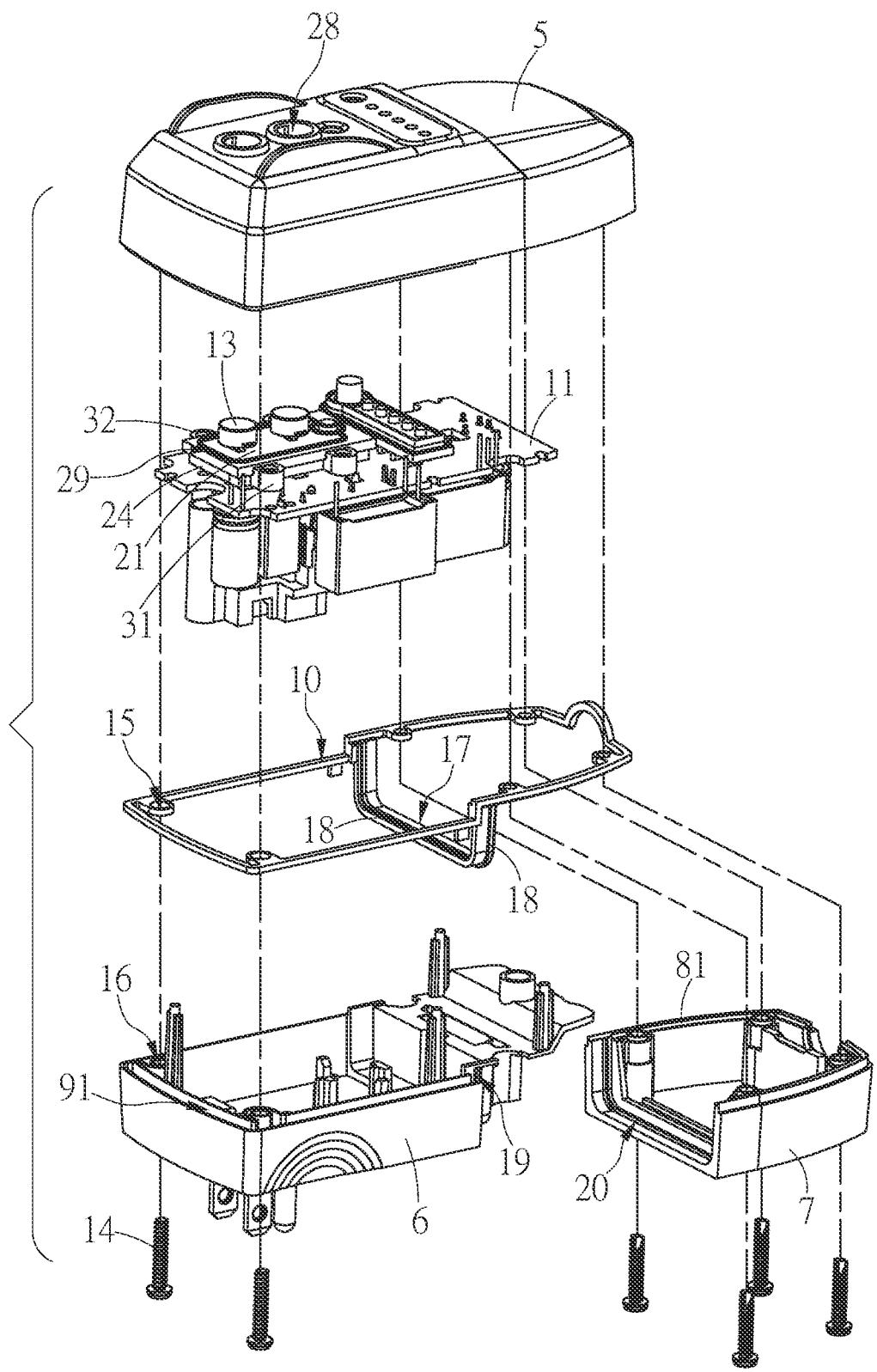
FIG. 6 is the exploded structure schematic diagram of the present invention.
Figure 7:
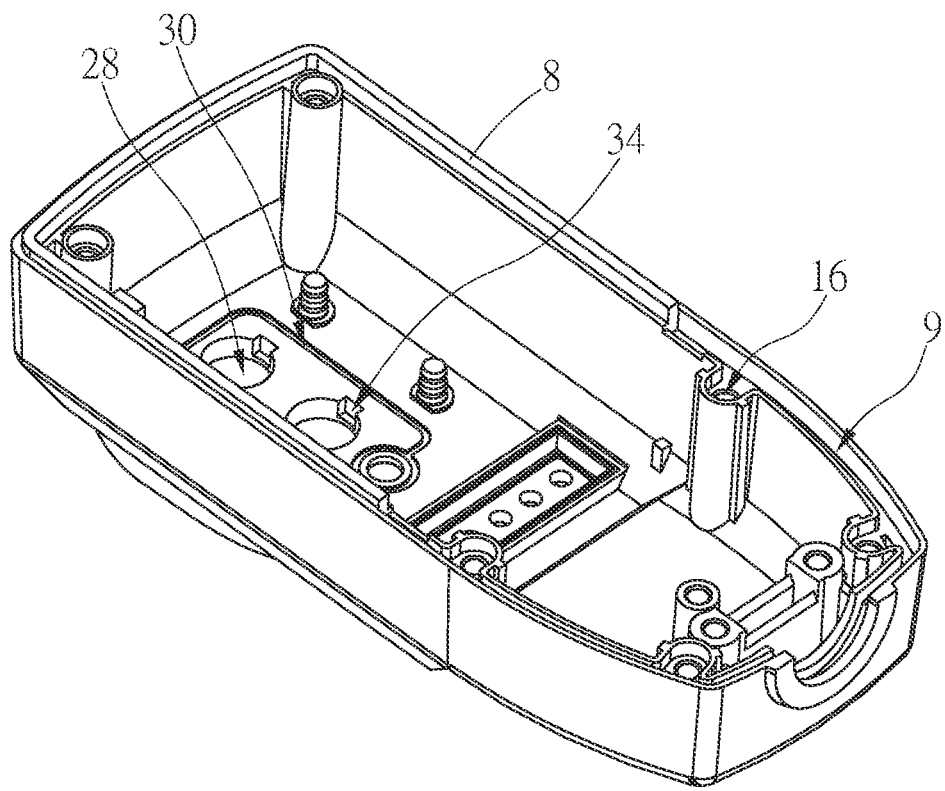
FIG. 7 is the structural representation of the upper cover of the present invention.

A plug provided in this embodiment, as shown in FIG. 5 to FIG. 7, includes an outer shell, a waterproof ring 10, a control assembly installed in the outer shell, and a button control assembly installed in the outer shell. The outer shell includes an upper shell 5 and a lower shell. The waterproof ring 10 is located between the upper shell 5 and the lower shell, and the upper shell 5 is sealedly connected to the lower shell through the waterproof ring 10; the button control assembly includes a button 13, a button waterproof unit and a button fixing unit, the button 13 is installed in the outer shell, the button fixing unit is installed in the outer shell, the button fixing unit is used for contacting with the control circuit board 11, the button waterproof unit It is installed between the button 13 and the button fixing unit. The control assembly includes a control circuit board 11, a voltage output unit 12 and a safety circuit breaker unit. The control circuit board 11 is provided with any one of the circuits of the first and second embodiments that automatically detect the leakage protection function at regular intervals, and the safety circuit breaker unit. That is, the circuit breaker X1, the circuit switch 51 and the mounting seat used for fixing in the first embodiment, the safety circuit breaker unit is installed on the control circuit board 11, and the voltage output unit 12 is the connection between the plug of this embodiment and the outside, such as cables and wires, etc. When the plug of this embodiment leaks, the safety circuit breaker unit cuts off the output of the plug, thereby avoiding safety accidents. The control principle of the safety circuit breaker unit is the prior art, such as using a transformer to detect the output current, you can detect whether there is leakage current, when there is leakage current, the output will be cut off.

Specifically, as shown in FIG. 6, the waterproof ring 10 seals the junction of the upper shell 5 and the lower shell, and the waterproof ring 10 is assembled between the upper shell 5 and the lower shell, so that the connection between the upper shell 5 and the lower shell is for sealing, the waterproof ring 10 can be optionally made of colloidal material, which has good sealing performance, thereby ensuring good sealing and waterproofing at the connection between the upper shell 5 and the lower shell. Further, the plug of this embodiment is also provided with corresponding buttons 13, such as function test buttons, switch buttons, etc. Since the buttons 13 are installed on the outer shell, a button waterproof unit is set at the corresponding position of the outer shell installation button 13, and the button 13 is installed through the button waterproof unit. The button waterproof unit seals and isolates the installation place of the button 13 from the inner space of the outer shell, thereby improving the waterproof performance of the installation place of the button 13. Combined with the structure of the waterproof ring 10, waterproof treatment is performed at the position where the outer shell and the external environment may be connected, so that the embodiment achieves a good waterproof effect. That is to say, this embodiment not only has the function of automatic detection of leakage protection, but also has a good waterproof effect, so that the plug of this embodiment has very high reliability and safety.

Further, in the plug of this embodiment, as shown in FIG. 6, the outer shell further includes a plurality of screws 14, the waterproof ring 10 is provided with a plurality of locking holes 15, and the upper shell 5 and the lower shell are provided with corresponding locking holes 15. The screw holes 16 of the upper shell 5, the locking holes 15 of the waterproof ring 10 and the screw holes 16 of the lower shell are successively penetrated by the screws 14, and are screwed with the two screw holes 16.

Specifically, in the prior art, the upper shell 5 and the lower shell are mostly locked by the screws 14, and the waterproof ring 10 is not locked with the upper shell 5 and the lower shell, which is easy to cause the waterproof ring 10 to be locked with the upper shell 5 and the lower shell. Connection is not tight enough. In this embodiment, a lock hole 15 is provided in the waterproof ring 10, and the lock hole 15 is connected to the two screw holes 16, so as to ensure that after the screw 14 is locked, the waterproof ring 10 can be tightly connected with the upper shell 5 and the lower shell. It helps to improve the sealing performance, thereby improving the waterproofness. In addition, the location of the lock hole 15 in the waterproof ring 10 can also increase the area of the waterproof ring 10, thereby increasing the contact area between the waterproof ring 10 and the upper shell 5 and the lower shell, which improves the sealing effect performance of the waterproof ring 10.

Optionally, the upper shell 5 in this embodiment is provided with a first connecting convex ring 8 and a first annular groove 9 on the side close to the lower shell, and the lower shell is provided with a second annular groove 91 and a second connecting protrusion. After the upper shell 5 and the lower shell are assembled, the waterproof ring 10 is assembled in the first annular groove 9 and the second annular groove 91, and the first connecting convex ring 8 is assembled in the second annular groove, the second connecting convex ring 81 is assembled in the first annular groove 9, and the first connecting convex ring 8 and the second connecting convex ring 81 are in contact with the waterproof ring 10.

Specifically, the upper shell 5 is provided with a first connecting convex ring 8 and a first annular groove 9, and the lower shell is provided with a second connecting convex ring 81 and a second annular groove 91. That is, the waterproof ring 10 is assembled on the upper shell. The first annular groove 9 of Compared with the prior art, the lower shell is only provided with a groove in the upper shell 5, and compared with a convex ring in the lower shell, this embodiment has better connection and sealing effect.

Further, as shown in FIG. 6 and FIG. 7, the lower shell includes a first half shell 6 and a second half shell 7 connected with the first half shell 6, and the waterproof ring 10 is provided with a connecting ring 17, so a first sealing ring 18 is protruded on both sides of the connecting ring 17, and a first waterproof groove 19 is opened at one end of the first half-shell 6 close to the second half-shell 7, and the second half-shell 7 is close to the first half-shell 7. One end of the half shell 6 is provided with a second waterproof groove 20, and the first sealing rings 18 on both sides of the connecting ring 17 are respectively assembled in the first waterproof groove 19 and the second waterproof groove 20.

Specifically, in order to facilitate the structural assembly of this embodiment, the lower case is set as a structure in which the first half-shell 6 and the second half-shell 7 are connected, and the connection between the first half-shell 6 and the second half-shell 7 is bound to be gaps. Therefore, in this embodiment, a connecting ring 17 is added to the waterproof ring 10. The structure is shown in FIG. 6. The first sealing ring 18 is provided on both sides of the connecting ring 17. The water groove 19 and the second waterproof groove 20 make the connection between the first half-shell 6 and the second half-shell 7 sealed to improve the waterproof performance of this embodiment, and at the same time connect the first half-shell 6 and the second half-shell 6 through the connecting ring 17. The two half shells 7 can also reduce the use of parts such as screws 14. Wherein, the connecting ring 17 and the first sealing ring 18 are both made of colloidal material with certain elasticity, and have a good sealing effect.

Figure 8:
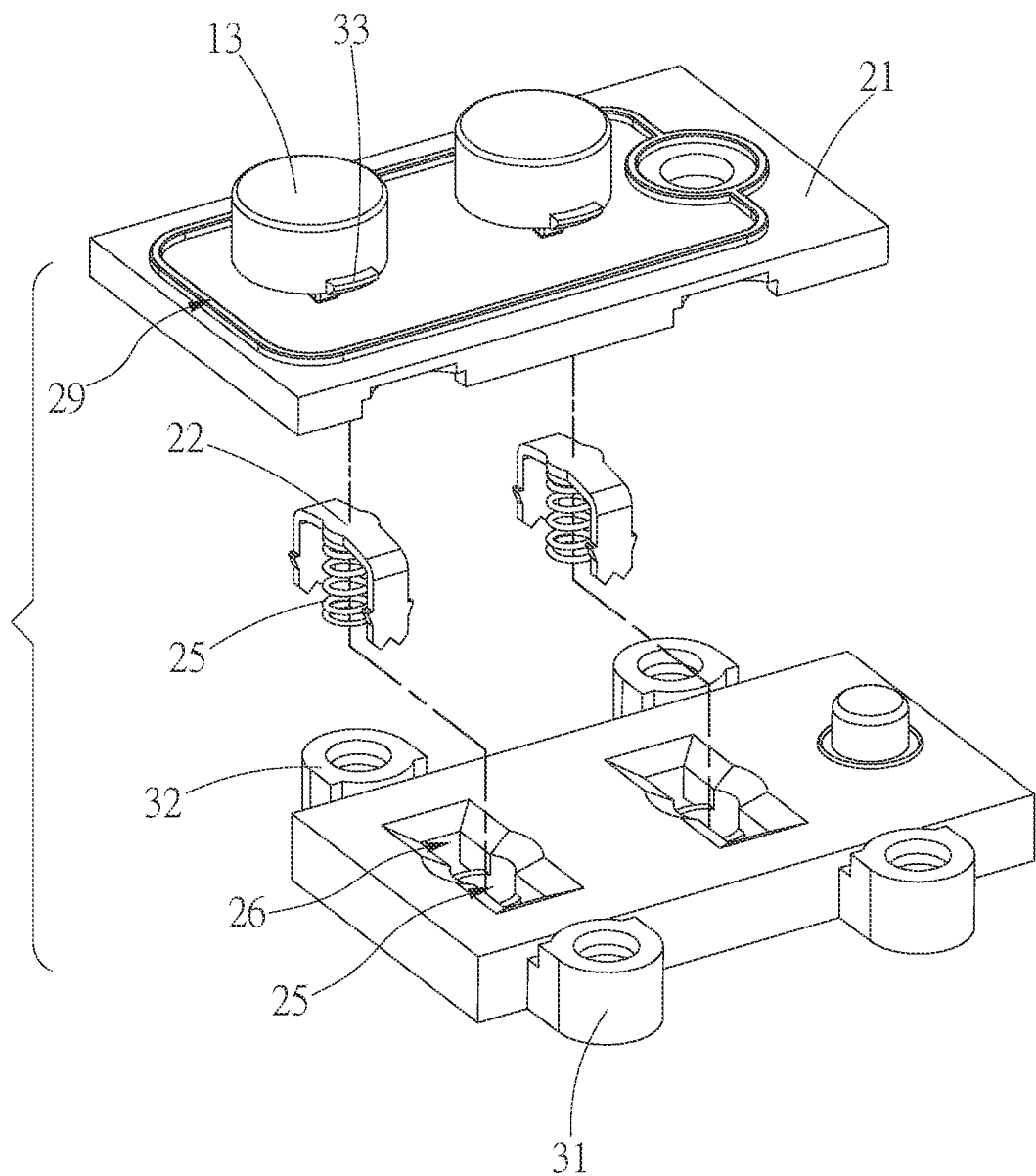
FIG. 8 is a schematic diagram of an exploded structure of the button control assembly of the present invention.
Figure 9:
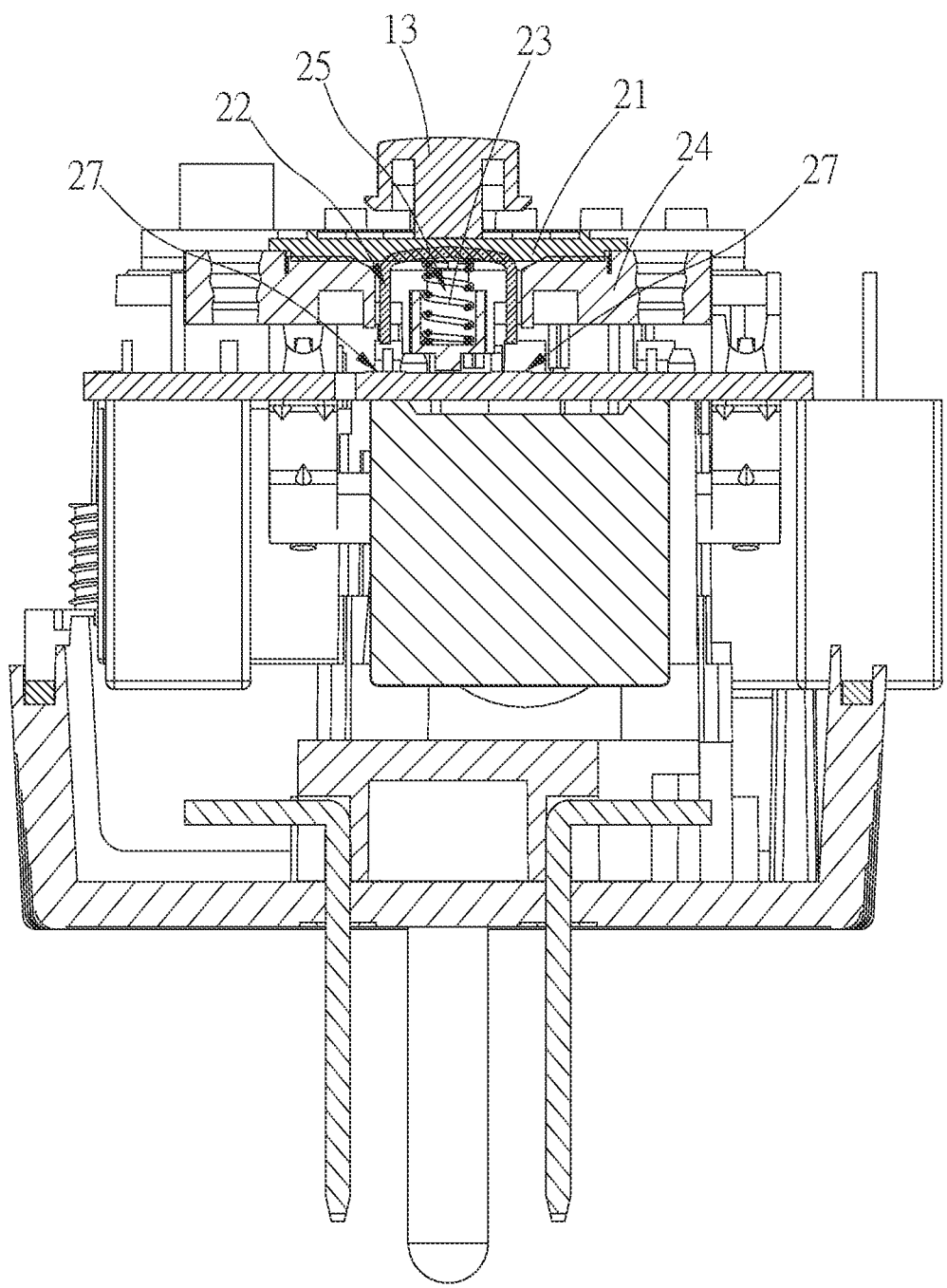
FIG. 9 is the sectional view one of the present invention.

In a plug provided in this embodiment, as shown in FIG. 6, FIG. 8 and FIG. 9, the button waterproof unit includes a waterproof elastic sheet 21, and the button fixing unit includes a connection terminal 22, an elastic reset member 23 and a fixing seat 24, the waterproof elastic sheet 21 is located between the outer shell and the fixing seat 24, the fixing seat 24 is provided with a reset hole 25 and a terminal hole 26, the elastic reset piece 23 is assembled in the reset hole 25. The terminal 22 is movably assembled in the terminal hole 26 and the connecting terminal 22 is in contact with the elastic reset member 23; the control circuit board 11 is provided with a contact 27, and the outer shell is provided with a through hole 28 for the button 13 to extend into the outer shell, the button 13 drives the connection terminal 22 to contact the contact 27 by abutting against the waterproof elastic sheet 21, the elastic reset member 23 is used to drive the connection terminal 22 to separate from the contact 27, and the waterproof elastic sheet 21 is used to cover the through hole 28.

Specifically, in the prior art, most of the rubber rings are arranged between the buttons 13 and the outer shell for waterproofing, but water still flows into the outer shell from the gap between the buttons 13 and the rubber ring or the gap between the rubber ring and the outer shell, and the rubber ring arranged at the button 13 will also affect the use of the button 13. In this embodiment, a waterproof elastic sheet 21 is provided, the waterproof elastic sheet 21 has no holes and is attached to the outer shell, the waterproof elastic sheet 21 covers the through hole 28, and both sides of the waterproof elastic sheet 21 are attached to the control circuit board 11, so that the waterproof of the two sides of the elastic sheet 21 cannot move so as to have a better waterproof effect. As shown in FIG. 9, the position where the waterproof elastic sheet 21 contacts the button 13 has room for movement, and the waterproof elastic sheet 21 has elasticity, so it will not affect the button 13. The button 13 can still drive the connection terminal 22 to move by abutting against the waterproof elastic sheet 21 so that the connection terminal 22 abuts against the contact 27 on the control circuit board 11; the connection with the outer shell flows into the outer shell, so that the waterproof performance of the plug of this embodiment is improved. Wherein, after the connection terminal 22 contacts the contact 27 on the control circuit board 11, the elastic reset member 23 drives the connection terminal 22 to reset, thereby separating the connection terminal 22 from the contact 27 of the control circuit board 11. Optionally, the waterproof elastic sheet 21 may be made of elastic gum material. As another implementation of this embodiment, the button waterproof unit can also be just a waterproof rubber ring, which is arranged at the connection between the button 13 and the outer shell. Although the waterproof effect is weak, it also has a certain waterproof effect. Set according to actual needs Further, a second sealing ring 29 is protruded from the waterproof elastic sheet 21, a sealing groove 30 is formed on the inner wall of the outer shell, the second sealing ring 29 is assembled in the sealing groove 30, and the through hole 28 is located in the sealing groove 30 inside the ring formed by the sealing ring.

Specifically, as shown in FIGS. 8 and 9, in order to further increase the waterproof effect of the waterproof elastic sheet 21, a second sealing ring 29 is provided on the waterproof elastic sheet 21, the second sealing ring 29 is in contact with the sealing groove 30 and the button 13. The connection with the outer shell is further isolated from the space inside the outer shell, thereby improving the sealing effect of the waterproof elastic sheet 21.

In a plug provided in this embodiment, as shown in FIG. 6 and FIG. 8, a first positioning block 31 and a second positioning block 32 are respectively provided on both sides of the fixing base 24, and the first positioning block 31 interferes with the waterproof on one side of the elastic sheet 21, the second positioning block 32 abuts against the other side of the waterproof elastic sheet 21.

Specifically, in this embodiment, the waterproof elastic sheet 21 is pressed against the waterproof elastic sheet 21 so that the waterproof elastic sheet 21 is closely attached to the housing without using glue, which is not only easy to assemble, but also low in cost. At the same time, the first positioning block 31 and the second positioning blocks 32 limit the waterproof elastic sheet 21 to effectively prevent the waterproof elastic sheet 21 from being displaced.

In a plug provided in this embodiment, as shown in FIGS. 7 and 8, the button 13 is provided with a limit block 33, and the outer shell is provided with a button limit slot 34 for limiting the movement of the limit block 33. Specifically, the setting of the limiting block 33 and the limiting groove can effectively prevent the buttons from being separated from the outer shell.

In a plug provided in this embodiment, as shown in FIGS. 6 and 50 to 53, in addition to the circuit breaker X1, the circuit switch 51 and the mounting seat, the safety circuit breaker unit is also provided with a circuit breaker 38. The circuit breaker 38 is equipped with a circuit breaker. Set on the control circuit board 11 and used to control the voltage output of the voltage output unit 12, the mounting base includes a circuit breaker bracket 35 and a switch bracket 36, the circuit breaker bracket 35 is connected to the switch bracket 36, and the circuit breaker X1 Installed on the circuit breaker bracket 35, the circuit breaker switch 38 includes a rotating shaft 40 and a control arm 41, the control arm 41 is connected with the rotating shaft 40, the switch support 36 is provided with a rotating hole 42, and the rotating shaft 40 rotates in the turning hole 42 so that the control arm 41 is hinged with the switch bracket 36, the control arm 41 is used to drive the switch control member 39 to move so that the switch control member 39 is disconnected or connected to the output of the voltage output unit 12; the open circuit The output end of the device X1 is connected to the disconnect switch 38 and used to drive the disconnect switch 38 to rotate.

Figure 10:
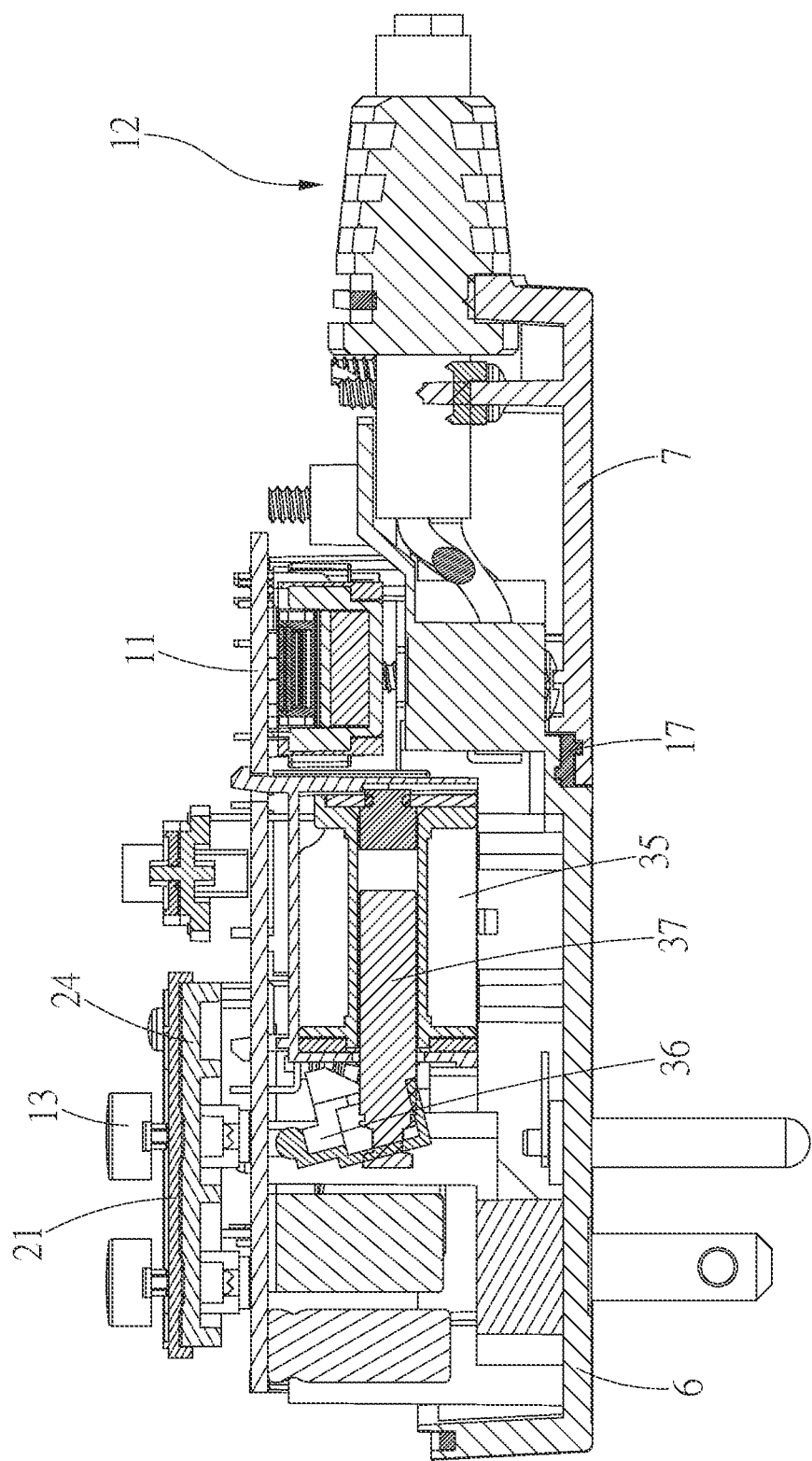
FIG. 10 is a sectional view two of the present invention.
Figure 11:
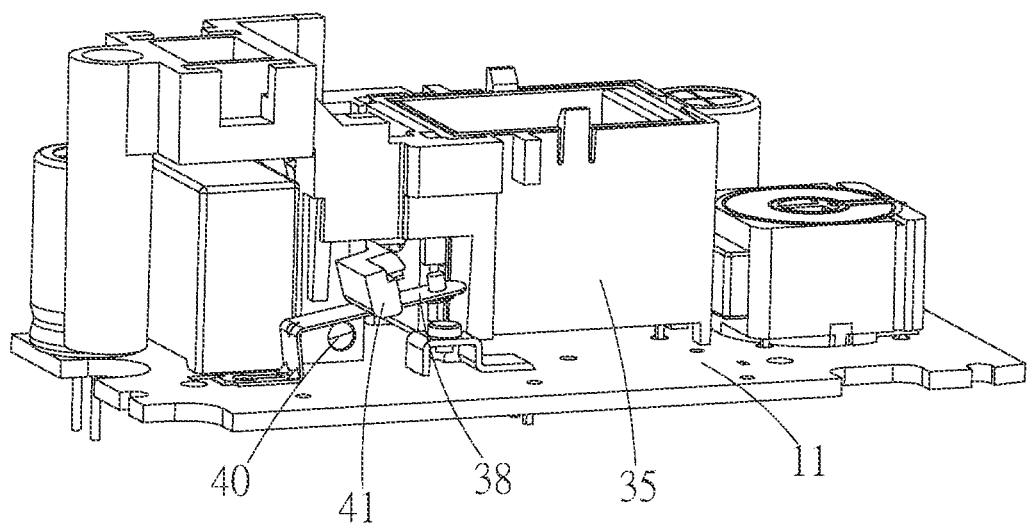
FIG. 11 is a schematic structural diagram of a safety circuit breaker unit of the present invention.
Figure 12:
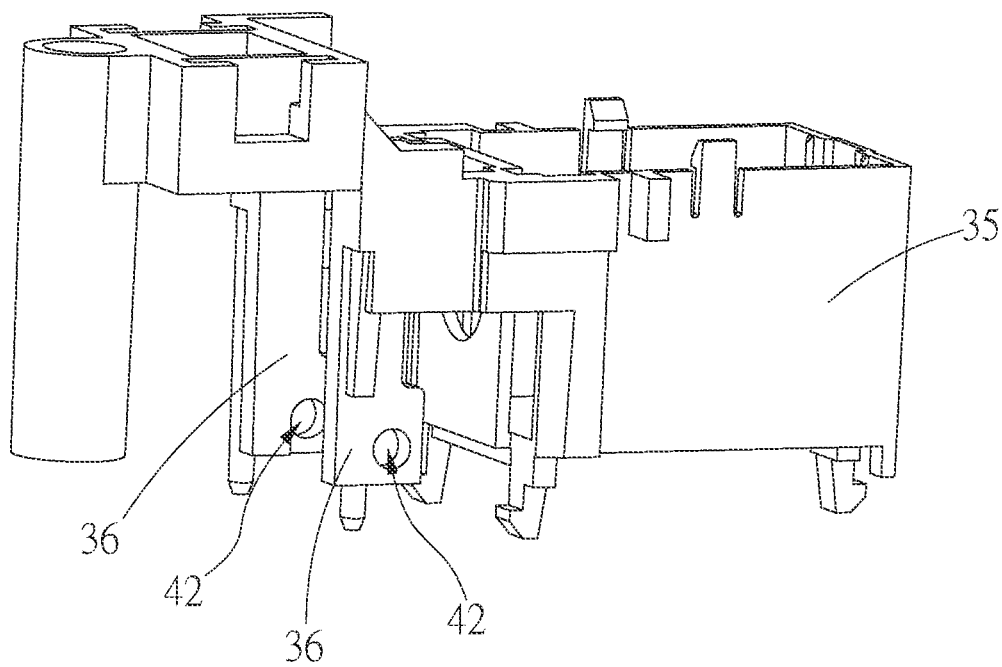
FIG. 12 is a schematic structural diagram of a mounting seat of the present invention.
Figure 13:
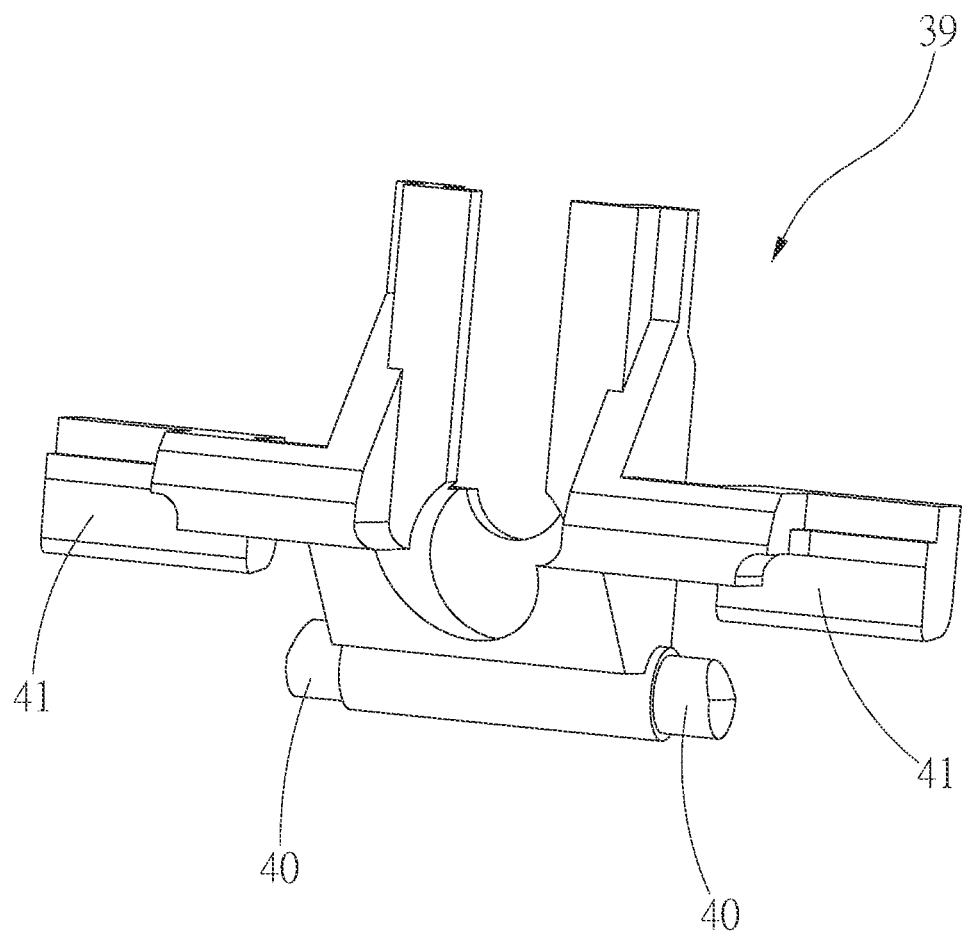
FIG. 13 is a schematic structural diagram of the switch control member of the present invention.

Specifically, the circuit breaker X1 of the present embodiment is a circuit breaker component in the prior art, such as an electromagnet. When a voltage difference occurs between the two ends of the electromagnet due to electric leakage, the electromagnet generates a magnetic force. The specific principle is: as shown in FIGS. 10, 11 and 13, the circuit breaker X1 generates a magnetic force, and the output end of the circuit breaker X1 can drive the circuit breaker 38 to rotate, the circuit breaker 38 rotates to make the control arm 41 rotate, and the control arm 41 then drives the switch control member 39. The movement disconnects the switch control member 39 from the switch point on the control circuit board 11, as shown in FIG. 13, thereby disconnecting the output of the plug of this embodiment. This embodiment realizes the control of the voltage safety output by means of electromagnetism, so as to ensure the safe use of the plug of this embodiment.

The above are only preferred embodiments of the present invention, and are not intended to limit the present invention in any form. Although the present invention is disclosed as a preferred embodiment, it is not intended to limit the present Professional and technical personnel, within the scope of the technical solution of the present invention, make some changes or modifications to equivalent examples of equivalent changes by using the technical content disclosed above, provided that they do not depart from the content of the technical solution of the present invention, according to the present invention. The invention technology refers to any simple modification, equivalent change and modification made to the above embodiments, which all belong to the scope of the technical solution of the present invention.

The invention claimed is:

1. A circuit for timing automatic detection of leakage protection function, comprising: a power supply module, a leakage detection module, a timing module, an input terminal for external power supply and an output terminal for outputting voltage, a current loop is formed between the input terminal and the output terminal, wherein the power supply module is connected to the external power supply through an input terminal, the power supply module includes a rectifier unit D3 and a power control unit, and an input of the rectifier unit D3 is electrically connected to the input terminal;

wherein the leakage detection module includes a main controller U1, a transformer and a circuit breaker X1, the transformer is used to sense whether there is a leakage signal in the current loop, the transformer is connected to the main controller U1 and transmits the leakage signal to the main controller U1, a circuit switch S1 is connected between the rectifier unit D3 and the output terminal, and the main controller U1 forms a first control signal to the operation of the power control unit according to the leakage signal from the transformer, the power control unit is used to make the circuit breaker X1 to open or close the circuit switch S1 according to the first control signal of the main controller U1 to disconnect or connect the outputting voltage from the rectifier unit D3; and wherein the timing module includes a timer U2 and a circuit on-off unit, the timer U2 is used to generate a second control signal to a control terminal of the circuit on-off unit to control whether the outputting voltage is outputted to the output terminal, wherein the power control unit includes a switch tube Q3, a switch tube Q4, a diode D5, a resistor R16, a resistor R17, a switch tube Q1, a switch tube Q2, a diode D4 and a diode D14; the input terminal is connected to a first switch terminal of the switch tube Q4 through a control terminal of the switch tube Q3, a second switch terminal of the switch tube Q4 is grounded, a control terminal of the switch tube Q4 is connected to the main controller U1, and the rectifier unit D3 is connected to a first switch terminal of the switch tube Q3 through the resistor R16, a second switch terminal of the switch tube Q3 is connected to an anode of the diode D14, a cathode of the diode D14 is connected to a cathode of the diode D4, and an anode of the diode D4 is connected to the main controller U1; the resistor R16 is connected to a cathode of diode D5, an anode of diode D5 is connected to ground through the resistor R17; and wherein an output of the rectifier unit D3 is connected to a first switch end of the switch tube Q1 through a first switch end of the switch tube Q2, a control end of the switch tube Q2 is connected to the first switch end of the switch tube Q1, and a second switch end of the switch tube Q1 is connected to, the control terminal of the circuit breaker X1 a second control terminal of the circuit breaker X1 is grounded, a control terminal of the switch tube Q1 is connected to the anode of the diode D5, and a second switch terminal of the switch tube Q2 is connected to the control terminal of the switch tube Q1.

2. The circuit for timing automatic detection of leakage protection function according to claim 1, wherein the circuit on-off unit includes a relay K1, a diode D13, a switch tube Q5 and a rectifier unit D12; and wherein the rectifier unit D12 rectifies an input signal of the input terminal, a first end of a coil of the relay K1 is connected to an output end of the rectifier unit D12, a second end of the coil of the relay K1 is connected to a first switch end of the switch tube Q5, and a second end of the switch tube Q5 is grounded, a control terminal of the switch tube Q5 is connected to the timer U2, a first switch terminal of the relay K1 is connected to the input terminal, a second switch terminal of the relay K1 is connected to the output terminal, and a first and second ends of the diode D13 are respectively connected to both the relay ends of the coil of K1.

3. The circuit for timing automatic detection of leakage protection function according to claim 1, wherein the circuit on-off unit includes a resistor R27, an optocoupler U3 and a switch tube Q6, the timer U2 is connected to a first end of a light emitter of the optocoupler U3, and a second end of the light emitter of the optocoupler U3 is connected to a first switch end of the switch tube Q6, a second switch end of the switch tube Q6 is grounded, a control end of the switch tube Q6 is connected to the timer U2, a first end of a light receiver of the optocoupler U3 is connected to the output end of the rectifier unit D3 through the resistor R27, and a second end of the light receiver of the optocoupler U3 is grounded.

4. The circuit for timing automatic detection of leakage protection function according to claim 1, wherein the timing module also includes an indicator unit, the indicator unit includes a plurality of LED lights, and the plurality of LED lights are all connected to the timer U2.

5. A plug, comprising an outer shell, a control assembly installed in the outer shell, and a button control assembly installed in the easing outer shell, wherein the control assembly includes the circuit of claim 1 that automatically detects leakage at regular intervals for protection.

6. The plug according to claim 5, wherein the plug further includes a waterproof ring, the outer shell includes an upper shell and a lower shell, the waterproof ring is located between the upper easing shell and the lower shell, and the upper shell is tightly connected to the lower shell through the waterproof ring; the button control assembly includes a button, a button waterproof unit and a button fixing unit, the button is installed in the outer shell, the a button fixing unit is installed in the outer shell, and the button fixing unit is used for connecting with a control unit circuit board contact, the button waterproof unit is installed between the button and the button fixing unit.

7. The plug according to claim 5, wherein the outer shell also includes a plurality of screws, the waterproof ring is provided with a plurality of locking holes, and the upper shell and the lower shell are provided with a plurality of screw holes corresponding to the plurality of locking holes; the plurality of screws passes through the plurality of screw holes of the upper shell, the plurality of locking holes of the waterproof ring and the plurality of screw holes of the lower shell to screw the upper shell, the waterproof ring and the lower shell.

8. The plug according to claim 5, wherein a side of an upper shell close to a lower shell is provided with a first connecting convex ring and a first annular groove, and the lower shell is provided with a second annular groove and a second connecting convex ring; the upper shell and the lower shell are assembled; after that, a waterproof ring is assembled in the first annular groove and the second annular groove, the first connecting convex ring is assembled in the second annular groove, and the second connecting convex ring is assembled in the first annular groove, and both the first connecting convex ring and the second connecting convex ring are in contact with the waterproof ring; and wherein the lower shell includes a first half shell and a second half shell connected to the first half shell, the waterproof ring is provided with a connecting ring, and both sides of the connecting ring are protruded with a first sealing ring, and a first end of the half shell close to the second half shell is provided with a first waterproof groove, a second end of the second half shell close to the first half shell is opened with a second waterproof groove, and the first sealing rings on both sides of the connecting ring are respectively assembled in the first waterproof groove and the second waterproof groove.

9. The plug according to claim 5,
wherein a button waterproof unit includes a waterproof elastic sheet, a button fixing unit includes a connection terminal, an elastic reset piece, and a fixing seat, the waterproof elastic sheet is located between an upper shell and the fixing seat, and the fixing seat is provided with a reset hole, a terminal hole, an elastic reset piece is assembled in the reset hole, the connection terminal is movably assembled in the terminal hole, and the connection terminal is in contact with the elastic reset piece; a control circuit board is provided with contacts, and the upper shell is provided with a through hole for a button to extend into an inside of the upper shell, the button drives a connecting terminal to contact a contact through contact with the waterproof elastic sheet, the elastic reset piece is used to drive the connecting terminal and the contact to separate, and the waterproof elastic sheet is used to cover the through hole; and wherein the waterproof elastic sheet is protruded with a second sealing ring, an inner wall of the upper shell is provided with a sealing groove, the second sealing ring is assembled in the sealing groove, and the through hole is located in a ring formed by the sealing ring.

\* \* \* \* \*